(12) United States Patent
Manabe et al.

(10) Patent No.: US 8,299,198 B2
(45) Date of Patent: Oct. 30, 2012

(54) POLYSILOXANE COMPOSITION, MOLDED BODY OBTAINED FROM THE SAME, AND OPTODEVICE MEMBER

(75) Inventors: Takao Manabe, Settsu (JP); Satoshi Sugiyama, Settsu (JP); Makoto Seino, Settsu (JP)

(73) Assignee: Kaneka Corporation, Osaka-shi (JP)

( * ) Notice: Subject to any disclaimer, the term of this patent is extended or adjusted under 35 U.S.C. 154(b) by 886 days.

(21) Appl. No.: 12/305,544

(22) PCT Filed: Jul. 19, 2007

(86) PCT No.: PCT/JP2007/064233
§ 371 (c)(1), (2), (4) Date: Dec. 18, 2008

(87) PCT Pub. No.: WO2008/010545
PCT Pub. Date: Jan. 24, 2008

(65) Prior Publication Data
US 2009/0225640 A1    Sep. 10, 2009

(30) Foreign Application Priority Data

| Jul. 21, 2006 | (JP) | ................................ 2006-199514 |
| Dec. 1, 2006 | (JP) | ................................ 2006-325555 |
| Feb. 8, 2007 | (JP) | ................................ 2007-029064 |
| Mar. 1, 2007 | (JP) | ................................ 2007-051291 |
| May 18, 2007 | (JP) | ................................ 2007-133292 |
| May 30, 2007 | (JP) | ................................ 2007-143514 |

(51) Int. Cl.
*C08G 77/12* (2006.01)
(52) U.S. Cl. ........................................... 528/31; 528/32
(58) Field of Classification Search .................... 528/31, 528/32
See application file for complete search history.

(56) References Cited

U.S. PATENT DOCUMENTS

| 6,252,030 B1 | 6/2001 | Zank et al. |
| 2003/0105246 A1 | 6/2003 | Andoh et al. |

FOREIGN PATENT DOCUMENTS

| EP | 348705 A2 | 6/1989 |
| JP | 2-67290 A | 3/1990 |
| JP | 6-329687 A | 11/1994 |
| JP | 11-71462 A | 3/1999 |
| JP | 2000-154252 A | 6/2000 |
| JP | 2000-265066 A | 9/2000 |
| JP | 2002-363414 A | 12/2002 |
| JP | 2003-137944 A | 5/2003 |
| JP | 2004-123936 A | 4/2004 |
| JP | 2005-290352 A | 10/2005 |
| JP | 2006-22207 A | 1/2006 |
| JP | 2006-265514 A | 10/2006 |
| JP | 2006-299149 A | 11/2006 |
| JP | 2006-299150 A | 11/2006 |
| JP | 2007-31619 A | 2/2007 |

OTHER PUBLICATIONS

Li et al. Journal of Inorganic and Organometallic Polymers, 11(3) (2001) 123-154.*
JP 2006 022207 Machine translation (2006).*
International Search Report of PCT/JP2007/064233, Mailing Date of Oct. 9, 2007.
Notification of Transmittal of Translation of the International Preliminary Report on Patentability (Form PCT/IB/338) of International Application No. PCT/JP2007/064233 mailed Feb. 5, 2009 with Forms PCT/IB/373 and PCT/ISA/237.

* cited by examiner

*Primary Examiner* — Kuo-Liang Peng
(74) *Attorney, Agent, or Firm* — Westerman, Hattori, Daniels & Adrian, LLP

(57) ABSTRACT

The present invention provides a polysiloxane composition maintaining high transparency over a wide wavelength region and a wide temperature region and being excellent in heat resistance, low-dielectric characteristics, workability, and the like. A polysiloxane composition includes (A) a polysiloxane which is composed of a polysiloxane compound having a polyhedral skeleton having 6 to 24 Si atoms in its molecule and which has at least one alkenyl group bonded directly or indirectly to a Si atom constituting the polyhedral skeleton, (B) a polysiloxane having a hydrosilyl group, and (C) a hydrosilylation catalyst.

20 Claims, No Drawings

POLYSILOXANE COMPOSITION, MOLDED BODY OBTAINED FROM THE SAME, AND OPTODEVICE MEMBER

TECHNICAL FIELD

The present invention relates to a polysiloxane composition maintaining high transparency over a wide wavelength region and a wide temperature region and being excellent in heat resistance, low dielectric characteristics, workability, and the like, a molded body obtained from the same, and an optodevice member.

BACKGROUND ART

Polysiloxane compositions are excellent in heat resistance, cold resistance, weather resistance, light resistance, chemical stability, electric characteristics, flame retardancy, water resistance, transparency, coloring properties, non-adhesiveness, and non-corrosiveness, and are used in various industries, and silica is generally mixed as a filler. However, resultant cured products are often opaque due to a difference in refractive index between silica and polysiloxane.

In order to resolve the problem, there is known a technique of introducing a phenyl group on a Si atom of a polysiloxane to control the refractive index thereof, thereby improving transparency of a composite material with silica. However, a composite material of a polysiloxane and silica is transparency, for example, at room temperature but tends to be clouded under high-temperature conditions due to a difference in temperature dependency of refractive index between the polysiloxane and silica. Therefore, to maintain transparency over a wide temperature region has been a large problem. In addition, there has been a problem of decreasing heat resistance and light resistance by introducing a phenyl group.

On the other hand, resin compositions characterized by containing a polysiloxane having a polyhedral skeleton are known.

For example, a hydrosilylated curable composition of functional group-containing silsesquioxane having a polyhedral skeleton is disclosed. In this technique, specifically, an example composed of vinyl group-containing silsesquioxane and hydrosilyl group-containing silsesquioxane is disclosed. However, the resultant material is rigid and quite brittle and has low molding workability (for example, Non-patent Document 1).

Also a resin composition containing silsesquioxane having a polyhedral skeleton having a carbon-carbon double bond and a radical initiator is disclosed (Patent Document 1). In this technique, a polysiloxane compound having a polyhedral skeleton is used as an additive for a thermoplastic resin, and the characteristics thereof are not sufficiently exhibited. In addition, the polysiloxane compound is not a matrix component, and thus the improving effect remains limited.

Further, a curable composition using a polysiloxane having a polyhedral skeleton containing an epoxy group has recently been disclosed (Patent Documents 2 and 3). In this technique, there is many hydrocarbon units (spacer composed of an alkylene chain) between an epoxy group and a polysiloxane skeleton which forms the polyhedral skeleton, and thus heat resistance and light resistance are not sufficient.

Further, a hybrid material including silsesquioxane having a specified structure and a polysiloxane is disclosed as an example not having a polyhedral skeleton (Patent Document 4). In this technique, substantially, one silsesquioxane unit is bonded at only two reaction points to a linear polysiloxane, thereby failing to achieve sufficient characteristics. Further, substantially only a phenyl group is disclosed as a substituent on a Si atom which constitutes a polysiloxane skeleton, and thus the material may be unsatisfactory from the viewpoint of heat resistance and light resistance.

Further, a copolymer produced by reaction between silsesquioxane having a polyhedral skeleton and a vinyl group-containing compound is disclosed. In this technique, the copolymer has a structure in which silsesquioxane having a polyhedral skeleton is grafted onto a polymer constituting a main chain, and exhibits a certain improving effect. However, the effect may be unsatisfactory (for example, Patent Document 5).

Although these polysiloxane compositions have the problems of a high coefficient of thermal expansion and low thermal dimensional stability, a resin composition composed of a polysiloxane having a polyhedral skeleton containing an epoxy group and an amino group is also disclosed. It is reported that the coefficient of thermal expansion can be suppressed by introducing a polysiloxane having a polyhedral skeleton into a resin composition (Patent Document 6 and Non-patent Document 2). However, in this technique, the composition includes many hydrocarbon units containing an epoxy group, an amino group, and a phenylene group, and coloring occurs due to heating or light irradiation. Therefore, the composition may become insufficient for use as a transparent material for films, sealants, and the like. Namely, there has been found no example of a material maintaining transparency and having excellent thermal dimensional stability and a low coefficient of thermal expansion.

In addition, a short-wavelength laser called a blue-violet laser (a wavelength of about 405 nm) has recently been used in large-capacity recording media such as next-generation DVD. Since the blue-violet laser has high energy as compared with a red laser (a wavelength of about 650 nm) generally used for DVD and the like, deterioration in a resin used for an optodevice becomes a large problem.

As a resin having blue-violet laser resistance, for example, cycloolefin resins and acrylic resins (for example, Non-patent Document 3, Patent Document 7, and Patent Document 8) and silicone resins (for example, Patent Document 9) have been disclosed. However, durability is not sufficient.

As described above, materials each including a polysiloxane compound having a polyhedral skeleton have been disclosed. However, there has been found no example of a material having sufficient physical properties, workability, and moldability, and thus development of a new material has been demanded.

[Non-patent Document 1] J. Am. Chem. Soc. 1998, 120, 8380-8391

[Non-patent Document 2] Macromolecules, 2006, 39, 5167-5169

[Non-patent Document 3] Journal of the Society of Rubber Industry, Japan, 2006, Vol. 79, No. 4, 244

[Patent Document 1] Japanese Unexamined Patent Application Publication No. 2002-363414

[Patent Document 2] Japanese Unexamined Patent Application Publication (Translation of PCT Application) No.

[Patent Document 3] Japanese Unexamined Patent Application Publication No. 2004-359933

[Patent Document 4] Japanese Unexamined Patent Application Publication No. 2006-22207

[Patent Document 5] U.S. Pat. No. 5,484,867 specification

[Patent Document 6] Japanese Unexamined Patent Application Publication (Translation of PCT Application) No.

[Patent Document 7] Japanese Unexamined Patent Application Publication No. 2004-204018

[Patent Document 8] Japanese Unexamined Patent Application Publication No. 2003-270401

[Patent Document 9] Japanese Unexamined Patent Application Publication No. 2006-202952

DISCLOSURE OF INVENTION

Problems to be Solved by the Invention

An object of the present invention is to resolve the above-mentioned problems and provide a polysiloxane composition maintaining high transparency over a wide wavelength region and a wide temperature region and being excellent in heat resistance, light resistance, low dielectric characteristics, workability, and the like, and a molded body obtained from the same. Another object is to provide an optodevice member using a laser in a wavelength region of 350 to 450 nm as a light source.

Means for Solving the Problems

As a result of intensive research for solving the problems, the inventors have found that a polysiloxane composition including a polysiloxane which is composed of a polysiloxane compound having a polyhedral skeleton having 6 to 24 Si atoms in its molecule and which has at least one alkenyl group bonded directly or indirectly to a Si atom constituting the polyhedral skeleton, a polysiloxane having a hydrosilyl group, and a hydrosilylation catalyst is excellent in heat resistance, low-dielectric characteristics, workability, and the like without deterioration in transparency over a wide wavelength region and a wide temperature region, resulting in the completion of the present invention. That is, the present invention has the following constitution.

1). A polysiloxane composition including:

(A) a polysiloxane which is composed of a polysiloxane compound having a polyhedral skeleton having 6 to 24 Si atoms in its molecule and which has at least one alkenyl group bonded directly or indirectly to a Si atom constituting the polyhedral skeleton;

(B) a polysiloxane having a hydrosilyl group; and (C) a hydrosilylation catalyst.

2). The polysiloxane composition described in 1) in which in the component (A), a Si atom constituting the polyhedral skeleton is bonded to an alkenyl group through a siloxane bond.

3). The composition described in 1) or 2) in which the alkenyl group in the component (A) is a vinyl group.

4). The polysiloxane composition described in any one of 1) to 3) in which the component (B) is a polysiloxane having a linear structure.

5). The polysiloxane composition described in any one of 1) to 4) in which the component (B) has a hydrosilyl group at a terminus of its molecule.

6). The polysiloxane composition described in any one of 1) to 5) in which the degree of polymerization of the component (B) is 2 to 300.

7). The polysiloxane composition described in any one of 1) to 3) in which the component (B) is a cyclic siloxane compound having a hydrosilyl group.

8). The polysiloxane composition described in 7), further containing as a component (F) a cyclic siloxane compound having an alkenyl group.

9). The polysiloxane composition described in any one of 1) to 7) in which the polysiloxane as the component (B) has at least two hydrosilyl groups.

10). The polysiloxane composition described in any one of 1) to 7) in which the component (B) is a reaction product obtained by hydrosilylation reaction between a hydrosilyl group-containing polysiloxane and an alkenyl group-containing organic compound, the reaction product having at least two hydrosilyl groups in its molecule.

11). The polysiloxane composition described in any one of 1) to 10), further containing (D) a curing retarder.

12). The polysiloxane composition described in 11) in which the component (D) is a propargyl alcohol and/or a maleate.

13) The polysiloxane composition described in any one of 1) to 12), further containing (E) an adhesion-imparting agent.

14). The polysiloxane composition described in 13) in which the component (E) is a silane coupling agent.

15). The polysiloxane composition described in 14) in which the component (E) is a silane coupling agent having at least one functional group selected from an epoxy group, a methacryl group, an acryl group, an isocyanate group, an isocyanurate group, a vinyl group, and a carbamate group, and a hydrolyzable silicate group.

16). The polysiloxane composition described in 13), in which the component (E) is an epoxy group-containing compound.

17). The polysiloxane composition described in 16), in which the component (E) is a polysiloxane having an epoxy group in its molecule and a polyhedral skeleton.

18). A cured product obtained by curing the polysiloxane composition described in any one of 1) to 16).

19). A method of molding the polysiloxane composition described in any one of 1) to 16), the method including dissolving the components (A) to (C) and, when the component (D) is contained, the component (D) according to demand in a solvent which can dissolve these components, partially reacting alkenyl groups of the component (A) with hydrosilyl groups of the component (B), distilling off the solvent to form a liquid resin composition, and then molding the composition.

20). A molded body obtained by the method of molding the polysiloxane composition described in 19).

21). The cured product described in 18), including a molded body and a light transmittance of 80% or more at a wavelength of 400 nm with a thickness of 3 mm, a change in the light transmittance at a wavelength of 400 nm after each of a test at 200±5° C. (24 hours in air) and a test using a metaling weather meter (a black panel temperature 120±5° C., irradiance 0.53±0.05 kW/m$^2$, integrated amount of irradiated light 50 MJ/m$^2$) being 5% or less of that before each test.

22). An optodevice member using a laser in a wavelength region of 350 to 450 nm as a light source, the member being composed of a silicone resin as a main component which exhibits a gel fraction of 95% or more after immersion in toluene for 72 hours at room temperature.

23). The optodevice member described in 22), in which the silicone resin which exhibits a gel fraction of 95% or more after immersion in toluene for 72 hours at room temperature is obtained from a polysiloxane composition including as essential components:

(A) a polysiloxane having at least one alkenyl group;

(B) a polysiloxane having at least two hydrosilyl groups; and (C) a hydrosilylation catalyst.

24). The optodevice member described in 23), in which the silicone resin is obtained by curing the polysiloxane composition described in any one of the items 1) to 17).

Advantages

The present invention can provide a polysiloxane composition maintaining high transparency over a wide wavelength region and a wide temperature region and being excellent in heat resistance, light resistance, low dielectric characteristics, workability, and the like. Also the present invention can provide an optodevice member using a laser in a wavelength region of 350 to 450 nm as a light source.

DETAILED DESCRIPTION OF THE INVENTION

The present invention will be described in detail below. The present invention relates to a polysiloxane composition including (A) a polysiloxane which is composed of a polysiloxane compound having a polyhedral skeleton having 6 to 24 Si atoms in its molecule and which has at least one alkenyl group bonded directly or indirectly to a Si atom constituting the polyhedral skeleton, (B) a polysiloxane having a hydrosilyl group, and (C) a hydrosilylation catalyst.

<(A) Polysiloxane Having Polyhedral Skeleton>

In the present invention, the component (A) is a polysiloxane which is composed of a polysiloxane compound having a polyhedral skeleton having 6 to 24 Si atoms in its molecule and which has at least one alkenyl group bonded directly or indirectly to a Si atom constituting the polyhedral skeleton.

In the present invention, the number of Si atoms contained in the polyhedral skeleton is preferably 6 to 24. Specifically, silsesquioxane having a polyhedral structure represented by the following structure is exemplified (as a typical example in which the number of Si atoms=8).

[Chemical Formula 1]

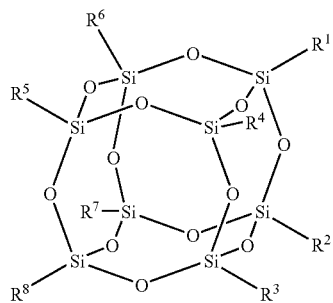

wherein $R^1$ to $R^8$ are the same or different unsubstituted or substituted monovalent hydrocarbon groups preferably having 1 to 20 carbon atoms and more preferably 1 to 10 carbon atoms and selected from alkenyl groups such as a vinyl group, an allyl group, a butenyl group, a hexenyl group, and the like; organic groups containing a (meth)acryloyl group, an epoxy group, a mercapto group, or an amino group; a hydrogen atom; alkyl groups such as a methyl group, an ethyl group, a propyl group, a butyl group, and the like; cycloalkyl groups such as a cyclohexyl group and the like; aryl groups such as a phenyl group, a tolyl group, and the like; and these groups in each of which hydrogen atoms bonded to carbon atoms are partially or entirely substituted by halogen atoms, cyano groups, or the like, such as a chloromethyl group, a trifluoropropyl group, a cyanoethyl group, and the like. However, at least one of $R^1$ to $R^8$ is an alkenyl group. Among the alkenyl groups, a vinyl group is preferred from the viewpoint of heat resistance. When a group other than an alkenyl group is selected, a methyl group is preferred from the viewpoint of heat resistance.

The silsesquioxane having the polyhedral skeleton is obtained by, for example, a hydrolytic condensation reaction of a silane compound of $RSiX_3$ (wherein R represents the above-described $R^1$ to $R^8$, and X represents a hydrolyzable functional group such as a halogen atom, an alkoxy group, or the like). Another known method for synthesizing the silsesquioxane having the polyhedral skeleton includes synthesizing a trisilanol compound having three silanol groups in its molecule by a hydrolytic condensation reaction of $RSiX_3$ and then further reacting the same or different trifunctional silane compound to close a ring.

In the present invention, as a more preferred example, silica having a polyhedral structure represented by the structure below is exemplified (as a typical example in which the number of Si atoms=8). In the compound, Si atoms which constitute the polyhedral skeleton are bonded to alkenyl groups through siloxane bonds. Therefore, a resultant cured product is not excessively rigid, and a good molded body can be produced.

[Chemical Formula 2]

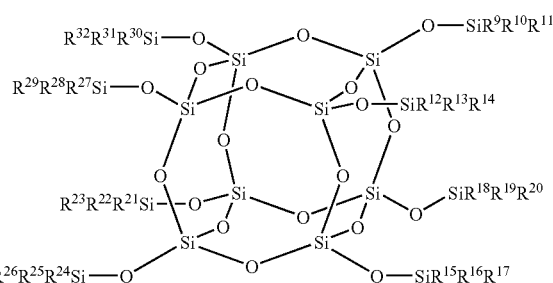

wherein $R^9$ to $R^{32}$ are the same or different organic groups selected from alkenyl groups such as a vinyl group, an allyl group, a butenyl group, a hexenyl group, and the like; organic groups containing a (meth)acryloyl group, an epoxy group, a mercapto group, or an amino group; a hydrogen atom; alkyl groups such as a methyl group, an ethyl group, a propyl group, a butyl group, and the like; cycloalkyl groups such as a cyclohexyl group and the like; aryl groups such as a phenyl group, a tolyl group, and the like; and these groups in each of which hydrogen atoms bonded to carbon atoms are partially or entirely substituted by halogen atoms, cyano group, or the like, such as a chloromethyl group, a trifluoropropyl group, a cyanoethyl group, and the like. However, at least one of $R^9$ to $R^{32}$ is an alkenyl group. Among the alkenyl groups, a vinyl group is preferred from the viewpoint of heat resistance. When a group other than an alkenyl group is selected, a methyl group is preferred from the viewpoint of heat resistance.

A method for synthesizing silica having a polyhedral structure is not particularly limited, and the silica is synthesized using a known method. As the synthetic method, for example, a method of hydrolytically condensing tetraalkoxysilane such as tetraethoxysilane in the presence of a base such as a tertiary ammonium hydroxide or the like can be used. In this synthetic method, a silicate salt having a polyhedral structure can be obtained by a hydrolytic condensation reaction of tetraalkoxysilane, and the resultant silicate salt is reacted with a silylating agent such as alkenyl group-containing silyl chloride to form a polysiloxane in which Si atoms constituting the polyhedral structure are bonded to alkenyl groups through siloxane bonds. In the present invention, what is called SILICA having the same polyhedral structure can be obtained from silica or a material containing silica, such as rice hulls, instead of tetraalkoxysilane.

In the present invention, the number of Si atoms contained in the polyhedral skeleton is preferably 6 to 24 and more preferably 6 to 10. A mixture of polysiloxanes having polyhedral skeletons containing different numbers of Si atoms may be used.

In the present invention, the number of alkenyl groups contained per molecule is preferably at least 1, more preferably at least 2, and most preferably at least 3.

<(B) Polysiloxane Having Hydrosilyl Group>

In the present invention, the component (B) has a hydrosilyl group (a hydrogen atom bonded directly to a Si atom) and preferably at least two hydrosilyl groups per molecule. Preferred examples of such a polysiloxane include a hydrosilyl group-containing polysiloxane having a linear structure, a polysiloxane having a hydrosilyl group at an end of its molecule, hydrosilyl group-containing cyclic siloxane, a reaction product containing at least two hydrosilyl groups in its molecule and obtained by hydrosilylation reaction between hydrosilyl group-containing cyclic siloxane and an alkenyl group-containing organic compound, and the like. These hydrosilyl group-containing compounds may be used alone or in combination of two or more.

Examples of the hydrosilyl group-containing polysiloxane having a linear structure include a copolymer of a dimethylsiloxane unit, a methyl hydrogen siloxane unit, and a terminal trimethylsiloxy unit, a copolymer of a diphenylsiloxane unit, a methylhydrogen siloxane unit, and a terminal trimethylsiloxy unit, a copolymer of a methylphenylsiloxane unit, a methyl hydrogen siloxane unit, and a terminal trimethylsiloxy unit, a polysiloxane having an end sealed with a dimethylhydrogen silyl group, and the like.

Examples of the polysiloxane having a hydrosilyl group at an end of its molecule include the exemplified polysiloxane having an end sealed with a dimethylhydrogen silyl group, polysiloxane composed of a dimethylhydrogen siloxane unit ($H(CH_3)_2SiO_{1/2}$ unit) and at least one siloxane unit selected from the group consisting of a $SiO_2$ unit, a $SiO_{3/2}$ unit, and a SiO unit.

Examples of the hydrosilyl group-containing cyclic siloxane include 1,3,5,7-tetrahydrogen-1,3,5,7-tetramethylcyclotetrasiloxane, 1-propyl-3,5,7-trihydrogen-1,3,5,7-tetramethylcyclotetrasiloxane, 1,5-dihydrogen-3,7-dihexyl-1,3,5,7-tetramethylcyclotetrasiloxane, 1,3,5-trihydrogen-trimethylcyclosiloxane, 1,3,5,7,9-pentahydrogen-1,3,5,7,9-pentamethylcyclosilxane, 1,3,5,7,9,11-hexahydrogen-1,3,5,7,9,11-hexamethylcyclosiloxane, and the like.

In the present invention, a hydrogen atom and a methyl group are preferably bound to a Si atom from the viewpoint of heat resistance and light resistance. In addition, when a coefficient of thermal expansion is suppressed, a cyclic siloxane compound can be preferably used.

In the present invention, as the component (B), a reaction product containing at least two hydrosilyl groups in its molecule and obtained by hydrosilylation reaction between the hydrosilyl group-containing polysiloxane and the alkenyl group-containing organic compound can be preferably used.

Preferred examples of the alkenyl group-containing organic compound include alkenyl group-containing alicyclic hydrocarbon compounds, alkenyl group-containing compounds having isocyanuric acid skeletons, dienes having carbon-carbon double bonds at ends of their molecules, diallyl ethers, dicyclopentadienes, and the like.

Examples of the alkenyl group-containing alicyclic hydrocarbon compounds include vinylcyclohexene, 1,2,4-trivinylcyclohexane, and the like.

Examples of the alkenyl group-containing compounds having isocyanuric acid skeletons include triallyl isocyanurate, diallylmonoglycidyl isocyanurate, and the like.

Examples of the dienes having carbon-carbon double bonds at ends of their molecules include decadiene, octadiene, and the like.

Examples of the diallyl ethers include diallyl ethers of 2,2-bis(4-hydroxycyclohexyl)propane, and the like.

In particular, the alkenyl group-containing compounds having an isocyanuric acid skeleton are preferred from the viewpoint of heat resistance and light resistance. Typical examples include triallyl isocyanurate and diallylmonoglycidyl isocyanurate.

The alkenyl group-containing organic compounds can be used alone or as a mixture or two or more.

Preferred examples of the hydrosilyl group-containing polysiloxane to be reacted with the alkenyl group-containing organic compound include the hydrosilyl group-containing polysiloxane having a linear structure, polysiloxane having a hydrosilyl group at an end of its molecule, hydrosilyl group-containing cyclic siloxane, and the like. From the viewpoint of good industrial availability and reactivity for reaction, the hydrosilyl group-containing cyclic siloxane is preferred. Specifically, 1,3,5,7-tetrahydrogen-1,3,5,7-tetramethylcyclotetrasiloxane is preferred.

The amount of the component (B) added is preferably a ratio at which the ratio of hydrogen atoms bonded directly to Si atoms is 30 to 240 mol % and more preferably 50 to 200 mol % relative to the alkenyl groups in the component (A). When the component (B) is excessively added, an appearance defect easily occurs due to foaming or the like, while when the amount is excessively small, the strength of the cured product is not sufficient.

<(C) Hydrosilylation Catalyst>

The hydrosilylation catalyst as the component (C) in the present invention is not particularly limited, and any desired hydrosilylation catalyst can be used. Typical examples include chloroplatinic acid; elemental platinum; solid platinum supported on an alumina, silica, or carbon black carrier; platinum-vinylsiloxane complexes such as $Pt_n(ViMe_2SiOSiMe_2Vi)_n$ and $Pt[(MeViSiO)_4]_m$; platinum-phosphine complexes such as $Pt(PPh_3)_4$ and $Pt(PBu_3)_4$; platinum-phosphite complexes such as $Pt[P(OPh)_3]_4$, and $Pt[P(OBu)_3]_4$ (wherein Me represents a methyl group, Bu represents a butyl group, Vi represents a vinyl group, Ph represents a phenyl group, and n and m each represent an integer); $Pt(acac)_2$; platinum-hydrocarbon complexes described in the specifications of Ashby et al. U.S. Pat. Nos. 3,159,601 and 3,159,662; and platinum alcoholate catalysts described in the specification of Lamoreaux et al. U.S. Pat. No. 3,220,972.

Examples of catalysts other than platinum compounds include $RhCl(PPh_3)_3$, $RhCl_3$, $Rh/Al_2O_3$, $RuCl_3$, $IrCl_3$, $FeCl_3$, $AlCl_3$, $PdCl_2\cdot2H_2O$, $NiCl_2$, $TiCl_4$, and the like. These catalysts may be used alone or in combination of two or more. From the viewpoint of catalyst activity, chloroplatinic acid, platinum-olefin complexes, platinum-vinylsiloxane complexes, $Pt(acac)_2$, and the like are preferred.

The amount of the catalyst as the component (C) is not particularly limited, but the catalyst is used in a range of $10^{-1}$ to $10^{-10}$ mol per mol of the alkenyl groups in the component (A). The catalyst is preferably used in a range of $10^{-2}$ to $10^{-7}$ mol per mol of the alkenyl groups in the component (A). The hydrosilylation catalyst is generally expensive and corrosive and a large amount of hydrogen gas may be produced to foam a cured product. Therefore, the amount is preferably less than $10^{-1}$ mol.

<(D) Curing Retarder>

In the present invention, the component (D) can improve the storage stability of the polysiloxane composition and control reactivity of a hydrosilylation reaction in a curing process. In the present invention, as the curing retarder, a known retardant used for addition-type curable compositions using a hydrosilylation catalyst can be used. Typical examples include compounds having aliphatic unsaturated bonds, organophosphorus compounds, organosulfur compounds, nitrogen-containing compounds, tin-based compounds, organic peroxides, and the like. These compounds may be used alone or in combination of two or more.

Examples of the compounds having aliphatic unsaturated bonds include propargyl alcohols such as 3-hydroxy-3-methyl-1-butyne, 3-hydroxy-3-phenyl-1-butyne, 3,5-dimethyl-1-hexyne-3-ol, 1-ethynyl-1-cyclohexanol, and the like; ene-ine compounds; maleic anhydride; and maleates such as dimethyl maleate, and the like.

Examples of the organophosphorus compounds include triorganophosphines, diorganophosphines, organophosphones, triorganophosphites, and the like.

Examples of the organosulfur compounds include organomercaptanes, diorganosulfides, hydrogen sulfide, benzothiazole, thiazole, benzothiazole disulfide, and the like.

Examples of the nitrogen-containing compounds include N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N',N'-tetraethylethylenediamine, N,N-dibutyl-1,4-butanediamine, 2,2'-bipyridine, and the like.

Examples of the tin-based compounds include stannous halide dihydrate, stannous carboxylates, and the like.

Examples of the organic peroxides include di-tert-butyl peroxide, dicumyl peroxide, benzoyl peroxide, tert-butyl perbenzoate, and the like. Among these, dimethyl maleate, 3,5-dimethyl-1-hexyne-3-ol, are 1-ethynyl-1-cyclohexanol can be exemplified as a particularly preferred curing retarder.

The amount of the curing retarder added is not particularly limited but is preferably in a range of $10^{-1}$ to $10^3$ moles and more preferably in a range of 1 to 300 moles relative to 1 mole of the hydrosilylation catalyst. These curing retarders may be used alone or in combination of two or more.

<(E) Adhesion-Imparting Agent>

The adhesion-imparting agent as the component (E) is used for improving adhesiveness to a base material of the composition of the present invention and is not particularly limited as long as the effect is exhibited. Preferred examples include silane coupling agents, epoxy group-containing compounds, and the like.

The silane coupling agents are not particularly limited as long as they are compounds each containing at least one each of a functional group with reactivity to an organic group and a hydrolyzable silicon group in its molecule. From the viewpoint of handleability, the functional group with reactivity to an organic group is preferably at least one functional group selected from an epoxy group, a methacryl group, an acryl group, an isocyanate group, an isocyanurate group, a vinyl group, and a carbamate group. From the viewpoint of curability and adhesiveness, an epoxy group, a methacryl group, and an acryl group are particularly preferred. From the viewpoint of handleability, the hydrolyzable silicon group is preferably an alkoxysilyl group, and from the viewpoint of reactivity, a methoxysilyl group and an ethoxysilyl group are particularly preferred.

Preferred examples of the silane coupling agents include alkoxysilanes having epoxy functional groups, such as 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, and the like; and alkoxysilanes having methacryl groups or acryl groups, such as 3-methacryloxypropyltrimethoxysilane, 3-methacryloxypropyltriethoxysilane, 3-acryloxypropyltrimethoxysilane, 3-acryloxypropyltriethoxysilane, methacryloxymethyltrimethoxysilane, methacryloxymethyltriethoxysilane, acryloxymethyltrimethoxysilane, acryloxymethyltriethoxysilane, and the like.

The amount of the silane coupling agent added is preferably 0.05 to 30% by weight, more preferably 0.1 to 10% by weight, and most preferably 0.5 to 6% by weight of the total weight of the components (A) and (B). When the adding amount is small, the effect of improving adhesiveness is not exhibited, while when the adding amount is large, the physical properties of the cured product may be adversely affected.

In the present invention, compounds generally used as epoxy resins can be used as the epoxy group-containing compounds, and a compound having 1 or more and preferably 2 or more epoxy groups, such as glycidyl groups, alicyclic epoxy groups, aliphatic epoxy groups, or the like, in its molecule can be used.

Typical examples of such compounds include, but are not limited to, flame retardant epoxy resins such as epichlorohydrin-bisphenol A epoxy resins, epichlorohydrin-bisphenol F epoxy resins, tetrabromobisphenol A glycidyl ether, and the like, novolac epoxy resins, phenol novolac epoxy resins, hydrogenated bisphenol A epoxy resins, bisphenol A propylene oxide adduct glycidyl ether epoxy resins, p-oxybenzoate-glycidyl ether ester epoxy resins, III-aminophenol epoxy resins, diaminodiphenylmethane epoxy resins, urethane-modified epoxy resins, various alicyclic epoxy resins, N,N-diglycidyl aniline, N,N-diglycidyl-o-toluidine, triglycidyl isocyanurate, polyhydric alcohol glycidyl ethers such as polyalkylene glycol diglycidyl ether, glycerin, and the like, hydantoin epoxy resins, silicone-modified epoxy resins, epoxy group-containing polysiloxane, epoxy compounds of unsaturated polymers such as petroleum resins, and the like. Any compound containing at least one epoxy group in its molecule can be used.

Among the above-described epoxy group-containing compounds, particularly, the epoxy group-containing polysiloxane can be preferably used from the viewpoint of heat resistance, light resistance, and compatibility with the other components. Further, an epoxy group-containing polysiloxane having a polyhedral skeleton represented by $[XSiO_{3/2}]_y$ (X is any functional group which may be the same or different but at least one X is an epoxy-group containing group; and y is an integer of 6 to 12) can be preferably used.

The amount of the epoxy group-containing compound added is preferably 0.01 to 100 parts by weight, more preferably 0.02 to 50 parts by weight, most preferably 0.05 to 20 parts by weight, and particularly preferably 0.05 to 5 parts by weight of a total of 100 parts by weight of the components (A) and (B). When the adding amount is small, the effect of improving adhesiveness is not exhibited, while when the adding amount is large, the physical properties of the cured product may be adversely affected.

In the present invention, the adhesion-imparting agents may be used alone or in combination of two or more.

In the present invention, a known adhesion promoter can be used for enhancing the effect of the adhesion-imparting agent. As the adhesion promoter, a boronate compound, an organoaluminum compound, and an organotitanium compound can be used. However, the adhesion promoter is not limited to these.

<(F) Alkenyl Group-Containing Cyclic Siloxane Compound>

In the present invention, an alkenyl group-containing cyclic siloxane compound can be added as a component (F).

When the component (F) is added, a resultant molded body has a small coefficient of thermal expansion and excellent thermal dimensional stability and is thus preferred. The component (F) is not particularly limited as long as it is an alkenyl group-containing cyclic siloxane compound, but a compound having at least two alkenyl groups in its molecule is preferred. A single alkenyl group-containing cyclic siloxane compound may be used or two or more alkenyl group-containing cyclic siloxane compounds may be combined.

Examples of the alkenyl group-containing cyclic siloxane compound include 1,3,5,7-vinyl-1,3,5,7-tetramethyl cyclotetrasiloxane, 1-propyl-3,5,7-trivinyl-1,3,5,7-tetramethyl cyclotetrasiloxane, 1,5-divinyl-3,7-dihexyl-1,3,5,7-tetramethyl cyclotetrasiloxane, 1,3,5-trivinyl-trimethyl cyclosiloxane, 1,3,5,7,9-pentavinyl-1,3,5,7,9-pentamethyl cyclosiloxane, 1,3,5,7,9,11-hexavinyl-1,3,5,7,9,11-hexamethyl cyclosiloxane, and the like.

In the present invention, a methyl group and a vinyl group are preferably bound to a Si atom from the viewpoint of heat resistance and light resistance.

The amount of the component (F) added can be variously determined but is preferably 1 to 50 parts by weight and more preferably 2 to 25 parts by weight relative to 100 parts by weight of [component (A) and component (B)]. When the adding amount is small, the effect of improving the coefficient of thermal expansion is not exhibited, while when the adding amount is large, the physical properties of the cured composition may be adversely affected.

<Composition>

In the present invention, the components (A) to (C) are dissolved in a solvent which can dissolve the components, and alkenyl groups of the component (A) and hydrosilyl groups of the component (B) are partially reacted. Then, the solvent is distilled off to form a composition which can be handled as a liquid resin composition. In this case, the component (A) which is generally solid and difficult to handle, process, and mold can be handled as a liquid resin composition.

As a method of distilling off the solvent, the solvent can be distilled off by a method of heating to the boiling point of the solvent or higher or a method of combining a reduced-pressure condition and heating. From the viewpoint of reduction of the solvent residue, a reduced-pressure condition and heating are preferably combined.

In addition, low-molecular-weight components and uncrosslinking components contained in the component (A) and/or the component (B) may be distilled off before the composition is produced. The low-molecular-weight components and uncrosslinking components are components which can decrease the gel fraction, possibly resulting in a decrease in blue laser resistance.

When the alkenyl groups of the component (A) and the hydrosilyl groups of the component (B) are reacted, the alkenyl groups of the component (A) and the hydrosilyl groups of the component (B) are partially reacted to form a composition having residual alkenyl groups and hydrosilyl groups. Then, the composition is further cured. This method can improve handleability. Also, a silicone resin composition having a high gel fraction is preferably easily obtained by this method. The temperature of the partial reaction between the alkenyl groups of the component (A) and the hydrosilyl groups of the component (B) is preferably 10° C. to 90° C. and more preferably 20° C. to 80° C. in the presence of the component (C). When the temperature is excessively low, the reaction does not proceed, while when the temperature is excessively high, the reaction excessively proceeds to cause gelation, thereby failing to handle as a liquid composition.

For the purpose of improving storage stability of the polysiloxane composition of the present invention or controlling reactivity of the hydrosilylation reaction in the curing process, the curing retarder as the component (D) can be used. A known retarder can be used as the curing retarder. Examples of the curing retarder include compounds having aliphatic unsaturated bonds, organophosphorus compounds, organosulfur compounds, nitrogen-containing compounds, tin-based compounds, organic peroxides, and the like. These compounds may be used alone or in combination of two or more.

In addition, a molded body can be formed by adding the component (E) and heat-curing the composition. The adhesiveness and adhesion of a cured product can be improved by adding the component (E). When a temperature is added for curing, the temperature is preferably 50° C. to 400° C. and more preferably 60° C. to 250° C. When the curing temperature is excessively high, appearance defects tend to occur in the resultant cured product, while when the curing temperature is excessively low, curing is insufficient. Further, curing may be performed in a combination of two or more steps of temperature conditions. For example, when the curing temperature is stepwisely increased to temperatures of lower than 100° C., 100° C. to lower than 130° C., and 130° C. or higher, specifically 70° C., 120° C., and 150° C., a good cured product can be preferably obtained.

The curing time can be appropriately selected according to the curing temperature, the amount of the hydrosilylation catalyst used, the amount of hydrosilyl groups, and a combination of the composition of the present invention and another component to be blended. For example, when the curing time is 1 minute to 4 hours and preferably 10 minutes to 2 hours, a good cured product can be obtained.

In addition to the above-described essential components, a filler such as ground quartz, calcium carbonate, carbon, or the like may be added as a desired component to the polysiloxane composition used in the present invention within a range in which the advantage of the invention is not inhibited.

Further, various additives such as a coloring agent, a heat resistance improver, and the like, a reaction controlling agent, a releasing agent, or a filler dispersant can be arbitrarily added to the polysiloxane composition of the present invention according to demand. Examples of the filler dispersant include diphenylsilanediol, various alkoxysilanes, carbon functional silane, silanol group-containing low-molecular-weight siloxane, and the like.

In order to impart flame retardancy and fire resistance to the polysiloxane composition of the present invention, a known additive such as titanium dioxide, manganese carbonate, $Fe_2O_3$, ferrite, mica, glass fibers, glass flakes, or the like may be added. The amount of the arbitrary component added is preferably minimized so as not to impair the advantage of the present invention.

The polysiloxane composition used in the present invention can be produced by uniformly mixing the components using a kneading machine such as a roll, a Banbary mixer, or a kneader, or a satellite stirring deaerator and, if required, heat-treating the resultant mixture.

The polysiloxane composition of the present invention can be used as a molded body. As a molding method, any method such as extrusion molding, compression molding, blow molding, calender molding, vacuum molding, foaming, injection molding, liquid injection molding, cast molding, or the like can be used.

The molded body obtained from the polysiloxane composition of the present invention is excellent in heat resistance and exhibits high transparency, i.e., high light transmittance, over a wide wavelength region and a wide temperature region. In addition, the molded body is preferred as a low-dielectric material and a low-refractive-index material.

The molded body obtained from the polysiloxane composition of the present invention is excellent in heat resistance and light resistance and has high light transmittance for light at a wavelength of about 400 nm in the ultraviolet region. This characteristic permits use as an optodevice member (optical material).

The polysiloxane composition of the present invention can be used as a composition for optical materials and can be used as an optodevice member by curing or the like. The optical materials include general materials used for application in which light such as visible light, infrared light, ultraviolet light, X-rays, a laser, or the like is transmitted through a material. On the assumption that the composition is used as an optical material, the light transmittance at a wavelength of 400 nm with a thickness of 3 mm is preferably 80% or more and more preferably 85% or more.

In recent years, optical materials have been required to be highly heat resistant and light resistant. In particular, a change in light transmittance (often decreases) after a test is desired to be small (a change of 5% or less, preferably 3% or less, more preferably 2% or less, particularly 1.5% or less, and possibly 0.3% or less of transmittance before the test).

Next, the evaluation of heat resistance and light resistance in the present invention will be described in detail.

The heat resistance can be evaluated by a method of analyzing the thermogravimetric decreasing behavior of a sample of 3 mm in thickness from 120° C. to 400° C. at a heating rate of 20° C./C in a nitrogen stream using a thermogravimetric apparatus to measure a temperature at which a weight reduction of 1% is observed (heat resistance test 1).

An evaluation method of storing a sample of 3 mm in thickness in air at 200±5° C. for 24 hours in a hot-air circulating oven and then comparing light transmittances at 400 nm before and after the test can be used (heat resistance test 2). As a result, a decrease in light transmittance after the heat resistance test is 5% or less, preferably 3% or less, and more preferably 2% or less.

As a simple method, for example, a method of allowing a sample of 3 mm in thickness to stand in an oven of 150° C. for 30 minutes, taking out the sample, and visually evaluating a decrease in transparency as compared with that before heating in the oven can be used. When a decrease in transparency is not observed, the heat resistance is evaluated as "◯", while when a decrease in transparency due to coloring or clouding is observed, the heat resistance is evaluated as "x" (heat resistance test 3) (referred to as "temperature dependency of transparency").

In order to evaluate the light resistance in the present invention, a sample of 3 mm in thickness is irradiated up to an integrated irradiance of 50 MJ/$m^2$ with an irradiance of 0.53±0.05 kW/$m^2$ at a black panel temperature of 120±5° C. to measure light transmittances before and after the test. In the present invention, a decrease in light transmittance after the light resistance test is preferably 5% or less and more preferably 3% or less (light resistance test 1). In the present invention, the term "light transmittance" represents transmittance of linear light and does not include transmittance of scattered light.

The molded body obtained in the present invention is excellent in durability for laser light in a short wavelength region and thus can be increased in lifetime. For example, a rate of change in laser light transmittance is less than 3%, preferably 1.5% or less, and particularly 0.3% or less even after irradiation with blue-violet laser light at 405 nm±10 nm with 80 mW/$mm^2$ for 100 hours in an environment of 60° C. Therefore, an optodevice member can be obtained in a preferred form (light resistance test 2).

The optodevice member of the present invention in which the surface quality of the member is slightly changed after the laser test can also be obtained in a preferred from.

More specifically, examples of application of the polysiloxane composition of the present invention include liquid crystal display peripheral materials in the liquid crystal display field, such as a substrate material, a color filter, an interlayer insulation film, an optical waveguide, a prism sheet, a polarizing plate, a TFT planarizing film, a color filter protecting film, a retardation film, a viewing angle correcting film, an adhesive, liquid crystal films such as a polarizer protecting film, and the like.

Other examples of the application include a sealing agent, an anti-reflection film, an optical correction film, a housing material, a front glass protecting film, a front glass alternative material, and an adhesive for color PDP (plasma display) which is expected as a next-generation flat panel display; a LED element molding material, a front glass protecting film, a front glass alternative, and an adhesive for a LED display; a substrate material, an optical waveguide, a prism sheet, a polarizing plate, a retardation film, a viewing angle correcting film, an adhesive, and a polarizer protecting film for a plasma addressed liquid crystal (PALC) display; a front glass protecting film, a front glass alternative material, and an adhesive for organic EL (electroluminescence) display; and various film substrates, a front glass protecting film, a front glass alternative material, and an adhesive for field-emission display (FED).

Examples of application in the optical recording field include a disk substrate material, a pickup lens, a protecting film, a sealing agent, and an adhesive for VD (video disk), CD/CD-ROM, CD-R/RW, DVD-R/DVD-RAM, MO/MD, PD (phase change disk), and an optical card.

Other preferred examples include members for optical pickup such as next-generation DVD, for example, a pickup lens, a collimator lens, an objective lens, a sensor lens, a protecting film, an element sealing agent, a sensor sealing agent, a grading, an adhesive, a prism, a wavelength plate, a correcting plate, a splitter, a hologram, a mirror, and the like.

Examples of application in the optical apparatus field include a lens material, a finder prism, a target prism, a finder cover, and a light-receiving sensor portion for a still camera; a taking lens and a finder for a video camera; a projection lens, a protecting film, a sealing agent, and an adhesive for a projection television; and a lens material, a sealing agent, an adhesive, and a film for a light sensing apparatus.

Examples of application in the optical component field include a fiber material, a lens, an optical waveguide, an element sealing agent, and an adhesive in the periphery of an optical switch in an optical communication system; an optical fiber material, a ferrule, a sealing agent, and an adhesive in the periphery of an optical connector; a lens, an optical waveguide, a LED element sealing agent, and an adhesive for an optical passive component and an optical circuit component; and a substrate material, a fiber material, an element sealing agent, and an adhesive in the periphery of an optoelectronic integrated circuit (OEIC).

Examples of application in the optical fiber field include illumination/light guide for a decorative display; industrial sensors and display/indicators; and optical fibers for communication infrastructure and home digital device connection.

Examples of semiconductor integrated circuit peripheral materials include microlithographic resist materials for LSI and super LSI materials.

Examples of application in the automobile/transport field include a lamp reflector, a bearing retainer, a gear portion, an anticorrosive coat, a switch portion, a head lamp, an engine internal component, an electric component, various interior/exterior components, a drive engine, a brake oil tank, an automotive rust-proof steel sheet, an interior panel, an interior material, a protecting/bundling wire harness, a fuel hose, an automotive lamp, and a glass alternative for automobiles; multiple glass for railway vehicles; and a toughening agent, an engine peripheral member, a protecting/bundling wire harness, and an anticorrosive coat for aircraft structural materials.

Examples of application in the building field include an interior processing material, an electric cover, a sheet, a glass intermediate film, a glass alternative, and a solar cell peripheral material. Examples of agricultural application include a house coating film. Examples of next-generation photoelectronic functional organic materials include next-generation DVD and organic EL element peripheral materials; and a substrate material, a fiber material, an element sealing agent, and an adhesive in the peripheries of an organic photorefractive element, a light amplifier serving as a light-light conversion device, a light computing element, and an organic solar cell.

In the present invention, particularly, the polysiloxane composition (silicone resin) exhibiting a gel fraction of 95% or more after immersion in toluene at room temperature for 72 hours can be preferably used as a main component of an optodevice member. When the polysiloxane composition (silicone resin) is used for an optodevice member, an optodevice member having excellent resistance to blue-violet laser can be provided.

In the present invention, 1 g of a sample is wrapped with a stainless wire mesh under a condition of 20±5° C., immersed in toluene for 72 hours, and then dried under conditions of 100° C. and 5 hours to measure the sample weight before and after the test. Then, a gel fraction can be calculated. Specifically, the gel fraction can be calculated by the calculation expression (gel fraction)=[(weight after test)/(weight before test)]×100.

In the present invention, the gel fraction is preferably 95% or more and more preferably 97% or more. Although the polysiloxane composition (silicone resin) is basically excellent in light resistance, the composition is not necessarily excellent in durability for a laser in the wavelength region of 350 nm to 450 nm. When the gel fraction is less than 95%, the refractive index of a laser transmitted portion is changed to cause stripes or unevenness on a surface.

The polysiloxane composition (silicone resin) used for the optodevice member is not particularly limited as long as it has a siloxane bond repeat unit in its molecule and exhibits a gel fraction of 95% or more after immersion in toluene for 72 hours at room temperature. Specifically, a polysiloxane resin obtained by curing a curable composition containing as essential components (A) a polysiloxane having at least one alkenyl group, (B) a polysiloxane having at least two hydrosilyl groups, and (C) a hydrosilylation catalyst is exemplified as the most preferred resin.

As the polysiloxane (A) having at least one alkenyl group, a wide range of known polysiloxanes can be used. In order to exhibit a high gel fraction, the amount of coexisting polysiloxane not containing an alkenyl group which may become an uncrosslinking component, particularly a low-molecular-weight polysiloxane, is preferably minimized.

In particular, a preferred example of the component (A) is the polysiloxane which is composed of a polysiloxane compound having a polyhedral skeleton having 6 to 24 Si atoms in its molecule and which has at least one alkenyl group bonded directly or indirectly to a Si atom constituting the polyhedral skeleton. In this case, in the present invention, the amount of coexisting polysiloxane not containing a hydrosilyl group which may become an uncrosslinking component, particularly a low-molecular-weight polysiloxane component, is preferably minimized.

Further, as the polysiloxane (B) having at least two hydrosilyl groups, and the hydrosilylation catalyst (C), the above-described components (B) and (C) can be preferably used.

In the present invention, the low-molecular-weight component and uncrosslinking component contained in each component are preferably previously distilled off before the production of the composition. The low-molecular-weight component and uncrosslinking component are components which can decrease the gel fraction, possibly resulting in a decrease in blue-violet laser resistance. In particular, the amount of coexisting polysiloxane not containing a hydrosilyl group which may become the uncrosslinking component in the component (B), particularly a low-molecular-weight polysiloxane component, is preferably minimized.

In the present invention, the coefficient of thermal expansion (CTE) can be suppressed. The CTE can be measured using a thermal mechanical analyzer (TMA). Specifically, measurement is performed from 40° C. to 250° C. at a heating rate of 10° C./min using, for example, a thermal mechanical analyzer (TMA-50, manufactured by Shimadzu Corporation) in a nitrogen atmosphere, and CTE can be evaluated using a value at 150° C. as a typical value.

In the present invention, the CTE value is preferably 300 ppm/K or less, more preferably 250 ppm/K or less, and particularly preferably 200 ppm/K or less. The coefficient of thermal expansion is preferably small because thermal dimensional stability is improved, and cracking or the like due to stress produced in heating or cooling can be suppressed from occurring in the cured product obtained in the present invention. In examples of the present invention, the coefficient of thermal expansion was measured by a thermal dimensional stability test.

The present invention can be applied to use in which high adhesiveness is required, particularly various sealing agents and adhesives. In this case, for example, the adhesive strength is preferably 0.4 kg or more and more preferably 0.8 kg or more in an adhesion test (die shear adhesion test) performed in the examples of the present invention.

EXAMPLES

Next, the composition of the present invention is described in further detail on the basis of examples, but the present invention is not limited to these examples.
<Test Method>
(Dielectric Constant)
A relative dielectric constant at 1 MHz was measured using a Q meter (Meguro Electric Co.,) under conditions of a temperature of 20° C. and a humidity of 50%.
(Heat Resistance Test 1)
The thermogravimetric decreasing behavior was analyzed from 120° C. to 400° C. in a nitrogen stream at a heating rate of 20° C./min using a thermogravimetric apparatus TGA-50 (manufactured by Shimadzu Corporation) to measure a temperature at which a weight reduction of 1% was observed.
(Light Transmittance)
Light transmittance was measured at a wavelength of 400 nm or wavelengths of 400 nm and 700 nm using an ultraviolet-visible spectrophotometer V-560 (manufactured by JASCO Co., Ltd.) under conditions of a temperature of 20° C. and a humidity of 50%.

(Temperature Dependency of Transparency)

A sample was allowed to stand in an oven of 150° C. for 30 minutes, and then taken out. When a decrease in transparency was not visually observed as compared with that before heating in the oven, the heat resistance was evaluated as "○", while when a decrease in transparency due to clouding was observed, the heat resistance was evaluated as "x".

(Heat Resistance Test 2)

A plate-shaped molded body of 3 mm in thickness was cured in a hot-air circulating oven set to 200° C. for 24 hours, and light transmittance after curing was measured.

(Light Resistance Test)

A metaling weather meter (model M6T) manufactured by Suga Test Instruments Co., Ltd. was used. A sample was irradiated up to an integrated amount of irradiated light of 50 MJ/m$^2$ at a black panel temperature 120° C. with an irradiance of 0.53 kW/m$^2$ and then measured for light transmittance or visually observed. When a decrease in transparency was not visually observed, the light resistance was evaluated as "○", while when coloring was observed, the light resistance was evaluated as "x".

(Adhesion Test)

A curable composition (150 g/m$^2$) was applied onto one of the surfaces of a glass chip (2-mm square), and the glass chip was laminated on an aluminum plate (A-1050P), followed by heating at 150° C. for 1 hour. After cooling to room temperature, the adhesive strength between the glass chip and the aluminum plate was measured using Bondtester SERIES4000 (manufactured by Dage Ltd.). The results are shown in Table 1.

(Heat Resistance Test 3)

A sample was allowed to stand in an oven of 150° C. for 30 minutes and then taken out. When a decrease in transparency was not visually observed as compared with that before heating in the oven, the heat resistance was evaluated as "○", while when coloring was observed, the heat resistance was evaluated as "x".

(Thermal Dimensional Stability Test)

Shimadzu thermal mechanical analyzer TMA-50 (Shimadzu Corporation) was used. The coefficient of thermal expansion (CTE, unit ppm/K) of a sample was determined by measurement from 40° C. to 250° C. at a heating rate of 10° C./min in a nitrogen atmosphere, and a value at 150° C. was adopted.

(Gel Fraction)

One g of sample was wrapped with a stainless wire mesh under a condition of 20±5° C., immersed in toluene for 72 hours, and then dried under conditions of 100° C. and 5 hours to measure the sample weight before and after the test. Then, a gel fraction was calculated by the following calculation expression:

(Gel fraction)=[(weight after test)/(weight before test)]×100.

(Blue-Violet Laser Resistance Test)

Blue-violet laser light at 405 nm±10 nm with 80 mW/mm$^2$ was applied using a laser diode (manufactured by Oxxius Inc., product name: Oxxius Violet 405 nm) for 100 hours in an environment of 60° C. In this irradiation, the quantity of laser transmitted was observed with a power meter (manufactured by Coherent Inc., product name: LM-2VIS) at the start and end of laser irradiation, and a change in laser transmittance was calculated by the following expression:

(Change in laser transmittance)=[(quantity of laser transmitted at start of test)−(quantity of laser transmitted at end of test)]×100/(quantity of laser transmitted at start of test)

In addition, a sample after laser irradiation was visually observed for the presence of an appearance change in a laser irradiated portion. When a change was not observed, the sample was evaluated as "○", while when surface irregularity or stripes in the irradiated portion were clearly observed, the sample was evaluated as "x". Further, the sample evaluated as "○" was further observed through an optical microscope. When surface irregularity or stripes in the irradiated portion were slightly observed, the evaluation level was downgraded to "Δ".

Example 1

First, 10 g of octa(vinyldimethylsiloxy)octasilsesquioxane (manufactured by Mayaterials) which was a polysiloxane having a polyhedral skeleton (silica) was dissolved in 10 g of toluene, and 30 μL of dimethyl maleate, 40 μL of 3,5-dimethyl-1-hexyne-3-ol, 40 μL of a platinum-vinylsiloxane complex (3% platinum, xylene solution), and 15 g of linear polydimethylsiloxane terminated with a hydrosilyl group (DMS-H03, manufactured by Gelest, Inc.) were added to the resultant solution and dissolved therein. The resultant solution was heated at 60° C. for 1 hour and then cooled to room temperature. Then, 40 μL of 3,5-dimethyl-1-hexyne-3-ol was added.

Then, a liquid resin composition prepared by distilling off toluene from the resultant reaction solution was poured into a mold and cured by heating at 70° C. for 30 minutes, 120° C. for 10 minutes, and 150° C. for 10 minutes to prepare an evaluation molded body of 3 mm in thickness. The various evaluation results are shown in Table 1.

Example 2

First, 10 g of octa(vinyldimethylsiloxy) octasilsesquioxane (manufactured by Mayaterials) was dissolved in 10 g of toluene, and 30 μL of dimethyl maleate, 40 μL of 3,5-dimethyl-1-hexyne-3-ol, 40 μL of a platinum-vinylsiloxane complex (3% platinum, xylene solution), and 20 g of linear polydimethylsiloxane terminated with a hydrosilyl group (MHD6 MH, manufactured by Clariant Japan) were added to the resultant solution and dissolved therein. The resultant solution was heated at 50° C. for 1 hour and then cooled to room temperature. Then, 40 μL of 3,5-dimethyl-1-hexyne-3-ol was added.

Then, a liquid resin composition prepared by distilling off toluene from the resultant reaction solution was poured into a mold and cured by heating at 70° C. for 30 minutes, 120° C. for 10 minutes, and 150° C. for 10 minutes to prepare an evaluation molded body of 3 mm in thickness. The various evaluation results are shown in Table 1.

Comparative Example 1

An evaluation molded body of 3 mm in thickness was prepared by the same method as in Example 1 except that MQV7 (manufactured by Clariant Japan) was used as vinyl group-containing silica not having a polyhedral structure instead of octa(vinyldimethylsiloxy)octasilsesquioxane (manufactured by Mayaterials) used in Example 1. The various evaluation results are shown in Table 1.

Comparative Example 2

An evaluation molded body of 3 mm in thickness was prepared by the same method as in Example 1 except that 10 g of vinyl-terminated polydimethylsiloxane DMS-V31 (manufactured by Gelest, Inc.) was used instead of octa(vinyldimethylsiloxy) octasilsesquioxane (manufactured by Mayaterials) used in Example 1, and 0.4 g of methylhydrosiloxane-dimethylsiloxane copolymer HMS-301 (manufactured by Gelest, Inc.) was used instead of linear polydimethylsiloxane (DMS-H03, manufactured by Gelest, Inc.). The various evaluation results are shown in Table 1.

Comparative Example 3

An evaluation molded body of 3 mm in thickness was prepared by the same method as in Comparative Example 2 except that 0.5 g of fumed silica SIS6962 (catalog value of particle size, 0.02 μm) manufactured by Gelest, Inc. was further added to the mixture. The evaluation results are shown in Table 1.

TABLE 1

| | | Example 1 | Example 2 | Comparative Example 1 | Comparative Example 2 | Comparative Example 3 |
|---|---|---|---|---|---|---|
| Heat resistance test 1 (° C.) | | >400 | 390 | 320 | 306 | 290 |
| Relative dielectric constant | | 2.5 | 2.4 | 2.8 | 2.7 | 2.8 |
| Light transmittance (%) | 700 nm | 93 | 93 | 93 | 93 | 80 |
| | 400 nm | 92 | 91 | 90 | 89 | 38 |
| Temperature dependency of transparency | | ○ | ○ | ○ | ○ | X |

Production Example 1

In a 5 L separable flask, 1.8 kg of toluene and 1.44 kg of 1,3,5,7-tetramethylcyclotetrasiloxane were added, and the resultant mixture was heated so that the internal temperature was 104° C. Then, a mixture of 200 g of triallyl isocyanurate, 1.44 mL of a platinum-vinylsiloxane complex xylene solution (containing 3 wt % of platinum), and 200 g of toluene was added dropwise to the mixture. The resultant mixture was refluxed under heating in an oil bath at 120° C. for 7 hours. Then, 1.7 g of 1-ethyny-1-cyclohexanol was added. Next, unreacted 1,3,5,7-tetramethylcyclotetrasiloxane and toluene were distilled off under reduced pressure. $^1$H-NMR indicated that the residue was a product of reaction between part of SiH groups of 1,3,5,7-tetramethylcyclotetrasiloxane and triallyl isocyanurate (referred to as "compound A", SiH value: 8.2 mmol/g, allyl value: 0.12 mmol/g).

Example 3

First, 10 g of octa(vinyldimethylsiloxy)octasilsesquioxane which was a polysiloxane having a polyhedral skeleton was dissolved in 3 g of toluene, and 0.1 μL of dimethyl maleate, 0.2 μL of a platinum-vinylsiloxane complex (3% platinum, xylene solution), and 5.9 g of linear polydimethylsiloxane terminated with a hydrosilyl group (DMS-H03, manufactured by Gelest, Inc.) were added to the resultant solution and dissolved therein. The resultant solution was heated at 60° C. for 1 hour and then cooled to room temperature. Then, 0.1 μL of dimethyl maleate was added.

Example 4

First, 3 g of octa(vinyldimethylsiloxy)octasilsesquioxane was dissolved in 3 g of toluene, and 0.4 μL of dimethyl maleate, 0.4 μL of 3,5-dimethyl-1-hexyne-3-ol, 0.4 μL of a platinum-vinylsiloxane complex (3% platinum, xylene solution), 3.0 g of linear polydimethylsiloxane terminated with a hydrosilyl group (DMS-H03, manufactured by Gelest, Inc.), and 1.6 g of compound A were added to the resultant solution and dissolved therein. The resultant solution was heated at 60° C. for 2 hours and then cooled to room temperature. Then, 0.1 μL of 3,5-dimethyl-1-hexyne-3-ol was added.

Example 5

First, 3 g of octa(vinyldimethylsiloxy)octasilsesquioxane was dissolved in 3 g of toluene, and 0.2 μL of dimethyl maleate, 0.2 μL of a platinum-vinylsiloxane complex (3% platinum, xylene solution), 3.0 g of linear polydimethylsiloxane terminated with a hydrosilyl group (DMS-H03, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 2 hours and then cooled to room temperature. Then, 0.2 μL of dimethyl maleate was added.

Then, a liquid resin composition prepared by distilling off toluene from the resultant reaction solution was poured into a mold and cured by heating at 70° C. for 30 minutes, 120° C. for 10 minutes, and 150° C. for 10 minutes to prepare an evaluation molded body of 3 mm in thickness. The various evaluation results are shown in Table 2.

TABLE 2

| | | Example 3 | Example 4 | Example 5 |
|---|---|---|---|---|
| Light transmittance at 400 nm (%) | Initial | 92 | 83 | 92 |
| | After heat resistance test 2 | 91 | 81 | 91 |
| | After light resistance test | 91 | 82 | 92 |

Example 6

First, 2.5 g of octa(vinyldimethylsiloxy)octasilsesquioxane which was a polysiloxane having a polyhedral skeleton was dissolved in 2.5 g of toluene, and 0.1 μL of dimethyl maleate, 0.12 μL of a platinum-vinylsiloxane complex xylene solution (platinum-vinylsiloxane complex containing 3 wt % of platinum, manufactured by Umicore Precious Metals Japan, Pt-VTSC-3X), and 3.43 g of 1,3,5,7-tetrahydrogen-1,3,5,7-tetramethyl cyclotetrasiloxane were added to the resultant solution. The resultant solution was heated at 60° C. for 1 hour and then cooled to room temperature. Then, 0.1 μL of dimethyl maleate was added.

Then, a liquid resin composition prepared by distilling off toluene from the resultant reaction solution was poured into a mold and heated at 70° C. for 30 minutes, 120° C. for 10 minutes, and 150° C. for 10 minutes to prepare an evaluation molded body of 3 mm in thickness.

Example 7

First, 2.0 g of octa(vinyldimethylsiloxy)octasilsesquioxane which was a polysiloxane having a polyhedral skeleton was dissolved in 2.0 g of toluene, and 0.54 μL of dimethyl maleate, 1.08 μL of a platinum-vinylsiloxane complex xylene solution (platinum-vinylsiloxane complex containing 3 wt % of platinum, manufactured by Umicore Precious Metals Japan, Pt-VTSC-3X), and 2.0 g of compound A prepared in Production Example 1 were added to the resultant solution. The resultant solution was heated at 60° C. for 1 hour and then cooled to room temperature. Then, 1.27 μL of 3,5-dimethyl-1-hexyne-3-ol was added.

Then, a liquid resin composition prepared by distilling off toluene from the resultant reaction solution was poured into a mold and heated at 70° C. for 30 minutes, 120° C. for 10 minutes, and 150° C. for 10 minutes to prepare an evaluation molded body of 3 mm in thickness.

Example 8

First, 2.0 g of octa(vinyldimethylsiloxy)octasilsesquioxane which was a polysiloxane having a polyhedral skeleton was dissolved in 2.0 g of toluene, and 0.1 μL of dimethyl maleate, 0.12 μL of a platinum-vinylsiloxane complex xylene solution (platinum-vinylsiloxane complex containing 3 wt % of platinum, manufactured by Umicore Precious Metals Japan, Pt-VTSC-3X), 1.85 g of 1,3,5,7-tetrahydrogen-1,3,5,7-tetramethyl cyclotetrasiloxane, and 0.2 g of 1,3,5,7-tetravinyl-1,3,5,7-tetramethyl cyclotetrasiloxane were added to the resultant solution. The resultant solution was heated at 60° C. for 1 hour and then cooled to room temperature. Then, 0.1 μL of dimethyl maleate was added.

Then, a liquid resin composition prepared by distilling off toluene from the resultant reaction solution was poured into a mold and heated at 70° C. for 30 minutes, 120° C. for 10 minutes, and 150° C. for 10 minutes to prepare an evaluation molded body of 3 mm in thickness.

Example 9

First, 5.0 g of octa(vinyldimethylsiloxy)octasilsesquioxane which was a polysiloxane having a polyhedral skeleton was dissolved in 5.0 g of toluene, and 0.2 μL of dimethyl maleate, 0.24 μL of a platinum-vinylsiloxane complex (manufactured by Umicore Precious Metals Japan, Pt-VTSC-3X), and 9.91 g of linear polydimethylsiloxane terminated with a hydrosilyl group (DMS-H03, manufactured by Gelest, Inc.) were added to the resultant solution. The resultant solution was heated at 60° C. for 1 hour and then cooled to room temperature. Then, 0.2 μL of dimethyl maleate was added.

Then, a liquid resin composition prepared by distilling off toluene from the resultant reaction solution was poured into a mold and heated at 70° C. for 30 minutes, 120° C. for 10 minutes, and 150° C. for 10 minutes to prepare an evaluation molded body of 3 mm in thickness.

The resultant molded bodies were subjected to the thermal dimensional stability test (indicated as "CTE"), the heat resistance test 3, and the light resistance test. The evaluation results are shown in Table 3.

TABLE 3

|  | CTE (ppm/K) | Heat resistance test 3 | Light resistance test |
| --- | --- | --- | --- |
| Example 6 | 175 | ○ | ○ |
| Example 7 | 172 | ○ | ○ |
| Example 8 | 130 | ○ | ○ |
| Example 9 | 250 | ○ | ○ |

Example 10

First, 3 g of octa(vinyldimethylsiloxy)octasilsesquioxane was dissolved in 3 g of toluene, and 0.4 μL of dimethyl maleate, 0.4 μL of 3,5-dimethyl-1-hexyne-3-ol, 0.4 μL of a platinum-vinylsiloxane complex (3% platinum, xylene solution), 3.0 g of linear polydimethylsiloxane terminated with a hydrosilyl group (DMS-H03, manufactured by Gelest, Inc.), 1.2 g of linear polydimethylsiloxane terminated with a hydrosilyl group (DMS-H21, manufactured by Gelest, Inc.), and 1.8 g of MQ resin terminated with a hydrosilyl group (product name MQH-8, manufactured by Clariant) were added to the resultant solution and dissolved therein.

The resultant solution was heated at 60° C. for 1 hour and then cooled to room temperature. Then, 0.1 μL of 3,5-dimethyl-1-hexyne-3-ol was added. Then, 0.025 g of 3-glycidoxypropyltrimethoxysilane was added to 1.0 g of a liquid resin composition prepared by distilling off toluene from the resultant reaction solution to prepare a curable composition.

The curable composition was poured into a mold and cured by heating at 60° C. for 20 minutes, 100° C. for 20 minutes, 130° C. for 20 minutes, and 150° C. for 20 minutes to prepare a molded body (3 mm in thickness) for the heat resistance/light resistance test. As a result of the heat resistance test 3 and the light resistance test, both the heat resistance and light resistance were evaluated as "○".

Example 11

First, 3 g of octa(vinyldimethylsiloxy)octasilsesquioxane was dissolved in 3 g of toluene, and 0.4 μL of dimethyl maleate, 0.4 μL of 3,5-dimethyl-1-hexyne-3-ol, 0.4 μL of a platinum-vinylsiloxane complex (3% platinum, xylene solution), 3.0 g of linear polydimethylsiloxane terminated with a hydrosilyl group (DMS-H03, manufactured by Gelest, Inc.), 1.2 g of linear polydimethylsiloxane terminated with a hydrosilyl group (DMS-H21, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 1 hour and then cooled to room temperature. Then, 0.1 μL of 3,5-dimethyl-1-hexyne-3-ol was added. Then, toluene was distilled off from the resultant reaction solution to prepare a curable composition.

TABLE 4

| | Example 10 | Example 11 |
|---|---|---|
| Adhesive strength (kg) | 1.929 | 0.104 |

Example 12

First, 3 g of octa(vinyldimethylsiloxy)octasilsesquioxane was dissolved in 3 g of toluene, and 0.4 µL of dimethyl maleate, 0.4 µL of 3,5-dimethyl-1-hexyne-3-ol, 0.4 µL of a platinum-vinylsiloxane complex (Pt-VTSC-3.0x, manufactured by N.E.M. Cat), 3.0 g of linear polydimethylsiloxane terminated with a hydrosilyl group (DMS-H03, manufactured by Gelest, Inc.), 1.2 g of linear polydimethylsiloxane terminated with a hydrosilyl group (DMS-H21, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 1 hour and then cooled to room temperature. Then, 0.1 µL of 3,5-dimethyl-1-hexyne-3-ol was added. Then, 0.0125 g of bisphenol A liquid epoxy resin (manufactured by Japan Epoxy Resin Co., Ltd.) was added to 0.5 g of a liquid resin composition prepared by distilling off toluene from the resultant reaction solution to prepare a curable composition. The resultant curable composition was subjected to the adhesion test. The result is shown in Table 5.

Example 13

First, 3 g of octa(vinyldimethylsiloxy)octasilsesquioxane was dissolved in 3 g of toluene, and 0.4 µL of dimethyl maleate, 0.4 µL of 3,5-dimethyl-1-hexyne-3-ol, 0.4 µL of a platinum-vinylsiloxane complex (Pt-VTSC-3.0x, manufactured by N.E.M. Cat), 3.0 g of linear polydimethylsiloxane terminated with a hydrosilyl group (DMS-H03, manufactured by Gelest, Inc.), 1.2 g of linear polydimethylsiloxane terminated with a hydrosilyl group (DMS-H21, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 1 hour and then cooled to room temperature. Then, 0.1 µL of 3,5-dimethyl-1-hexyne-3-ol was added. Then, 0.0125 g of bisphenol F liquid epoxy resin (manufactured by Japan Epoxy Resin Co., Ltd.) was added to 0.5 g of a liquid resin composition prepared by distilling off toluene from the resultant reaction solution to prepare a curable composition. The resultant curable composition was subjected to the adhesion test. The result is shown in Table 5.

Example 14

First, 3 g of octa(vinyldimethylsiloxy)octasilsesquioxane was dissolved in 3 g of toluene, and 0.4 µL of dimethyl maleate, 0.4 µL of 3,5-dimethyl-1-hexyne-3-ol, 0.4 µL of a platinum-vinylsiloxane complex (Pt-VTSC-3.0x, manufactured by N.E.M. Cat), 3.0 g of linear polydimethylsiloxane terminated with a hydrosilyl group (DMS-H03, manufactured by Gelest, Inc.), 1.2 g of linear polydimethylsiloxane terminated with a hydrosilyl group (DMS-H21, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 1 hour and then cooled to room temperature. Then, 0.1 µL of 3,5-dimethyl-1-hexyne-3-ol was added. Then, 0.0125 g of phenol novolac epoxy resin (manufactured by Japan Epoxy Resin Co., Ltd.) was added to 0.5 g of a liquid resin composition prepared by distilling off toluene from the resultant reaction solution to prepare a curable composition. The resultant curable composition was subjected to the adhesion test. The result is shown in Table 5.

Example 15

First, 3 g of octa(vinyldimethylsiloxy)octasilsesquioxane was dissolved in 3 g of toluene, and 0.4 µL of dimethyl maleate, 0.4 µL of 3,5-dimethyl-1-hexyne-3-ol, 0.4 µL of a platinum-vinylsiloxane complex (Pt-VTSC-3.0x, manufactured by N.E.M. Cat), 3.0 g of linear polydimethylsiloxane terminated with a hydrosilyl group (DMS-H03, manufactured by Gelest, Inc.), 1.2 g of linear polydimethylsiloxane terminated with a hydrosilyl group (DMS-H21, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 1 hour and then cooled to room temperature. Then, 0.1 µL of 3,5-dimethyl-1-hexyne-3-ol was added. Then, 0.0125 g of bisphenol F liquid epoxy resin (manufactured by Japan Epoxy Resin Co., Ltd.) and 0.003 g of trimethoxyborane were added to 0.5 g of a liquid resin composition prepared by distilling off toluene from the resultant reaction solution to prepare a curable composition.

The curable composition was poured into a mold and cured by heating at 60° C. for 20 minutes, 100° C. for 20 minutes, 130° C. for 20 minutes, and 150° C. for 20 minutes to prepare a molded body (3 mm in thickness) for the heat resistance/light resistance test. The resultant curable composition was subjected to the adhesion test. The result is shown in Table 5.

Production Example 2

First, 5.0 g of octa(dimethylsiloxy)octasilsesquioxane having a polyhedral skeleton was dissolved in 15.0 g of toluene and 6.73 g of aryl glycidyl ether, and 0.29 µL of a platinum-vinylsiloxane complex (Pt-VTSC-3.0x, manufactured by N.E.M. Cat) was added to the resultant solution, followed by reaction at 80° C. for 3 hours. After the completion of the reaction, toluene and aryl glycidyl ether excessively added were distilled off to prepare 7.56 g of epoxy group-containing octasilsesquioxane having a polyhedral skeleton.

Example 16

First, 2 g of octa(vinyldimethylsiloxy)octasilsesquioxane was dissolved in 2 g of toluene, and 0.08 µL of dimethyl maleate, 0.1 µL of a platinum-vinylsiloxane complex (Pt-VTSC-3.0x, manufactured by N.E.M. Cat), 2.1 g of linear polydimethylsiloxane terminated with a hydrosilyl group (DMS-H03, manufactured by Gelest, Inc.), 0.8 g of linear polydimethylsiloxane terminated with a hydrosilyl group (DMS-H21, manufactured by Gelest, Inc.), and 1.2 g of MQ resin terminated with a hydrosilyl group (product name MQH-8, manufactured by Clariant) were added to the resultant solution and dissolved therein. The resultant solution was heated at 60° C. for 1 hour and then cooled to room temperature. Then, 0.08 µL of dimethyl maleate was added. Then, 0.025 g of the epoxy group-containing octasilsesquioxane having a polyhedral skeleton which was produced in the above-described production example was added to 1.0 g of a liquid resin composition prepared by distilling off toluene from the resultant reaction solution to prepare a curable composition. The resultant curable composition was subjected to the adhesion test. The result is shown in Table 5.

Example 17

First, 3 g of octa(vinyldimethylsiloxy)octasilsesquioxane was dissolved in 3 g of toluene, and 0.4 µL of dimethyl maleate, 0.4 μL of 3,5-dimethyl-1-hexyne-3-ol, 0.4 μL of a platinum-vinylsiloxane complex (Pt-VTSC-3.0x, manufactured by N.E.M. Cat), 3.0 g of linear polydimethylsiloxane terminated with a hydrosilyl group (DMS-H03, manufactured by Gelest, Inc.), 1.2 g of linear polydimethylsiloxane terminated with a hydrosilyl group (DMS-H21, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 1 hour and then cooled to room temperature. Then, 0.1 μL of 3,5-dimethyl-1-hexyne-3-ol was added. Then, toluene was distilled off from the resultant reaction solution to prepare a curable composition. The resultant curable composition was subjected to the adhesion test. The result is shown in Table 5.

TABLE 5

| | Adhesive strength (kg) |
|---|---|
| Example 12 | 0.69 |
| Example 13 | 0.40 |
| Example 14 | 0.46 |
| Example 15 | 0.40 |
| Example 16 | 1.00 |
| Example 17 | 0.10 |

Example 18

First, 3 g of octa(vinyldimethylsiloxy)octasilsesquioxane which was a polysiloxane having a polyhedral skeleton was dissolved in 3 g of toluene, and 0.1 μL of dimethyl maleate, 0.2 μL of a platinum-vinylsiloxane complex (3% platinum, xylene solution), and 5.9 g of linear polydimethylsiloxane terminated with a hydrosilyl group (DMS-H03, manufactured by Gelest, Inc.) were added to the resultant solution and dissolved therein. The resultant solution was heated at 60° C. for 1 hour and then cooled to room temperature. Then, 0.1 μL of dimethyl maleate was added.

Then, a liquid resin composition prepared by distilling off toluene from the resultant reaction solution at 30° C. for 1 hour under reduced pressure was poured into a mold and cured by heating at 70° C. for 30 minutes, 120° C. for 10 minutes, and 150° C. for 10 minutes to prepare an evaluation molded body of 3 mm in thickness. The various evaluation results are shown in Table 6.

Example 19

First, 3 g of octa(vinyldimethylsiloxy)octasilsesquioxane was dissolved in 3 g of toluene, and 0.2 μL of dimethyl maleate, 0.2 μL of a platinum-vinylsiloxane complex (3% platinum, xylene solution), 3.1 g of linear polydimethylsiloxane terminated with a hydrosilyl group (DMS-H03, manufactured by Gelest, Inc.), and 1.2 g of linear polydimethylsiloxane terminated with a hydrosilyl group (DMS-H21, manufactured by Gelest, Inc.) were added to the resultant solution and dissolved therein. The resultant solution was heated at 60° C. for 2 hours and then cooled to room temperature.

Then, 1.8 g of polysiloxane terminated with a hydrosilyl group (product name MQH-8, manufactured by Clariant) which was dried under reduced pressure at 150° C. for 7 hours and 0.2 μL of dimethyl maleate were added to the reaction solution. Then, toluene was distilled off from the resultant mixture at 30° C. for 1 hour under reduced pressure to prepare a liquid resin composition. The resultant composition was poured into a mold and cured by heating at 70° C. for 30 minutes, 120° C. for 20 minutes, 150° C. for 20 minutes, and 180° C. for 20 minutes to prepare an evaluation molded body of 3 mm in thickness. The various evaluation results are shown in Table 6.

Example 20

First, 10 g of vinyl group-containing polysiloxane (MQV-7, manufactured by Clariant), 2.9 μL of dimethyl maleate, 2.6 μL of a platinum-vinylsiloxane complex (containing 3% of platinum, xylene solution), and 5.6 g of hydrosilyl group-containing polysiloxane (MQH-8, manufactured by Clariant) which was dried under reduced pressure at 150° C. for 7 hours were added and mixed to prepare a liquid resin composition. The resultant resin composition was poured into a mold and cured by heating at 60° C. for 20 minutes, 80° C. for 20 minutes, 100° C. for 20 minutes, 120° C. for 10 minutes, and 150° C. for 10 minutes to prepare an evaluation molded body of 3 mm in thickness. The various evaluation results are shown in Table 6.

Comparative Example 4

First, 10 g of vinyl group-containing polydimethylsiloxane (DMS-V31, manufactured by Gelest, Inc.), 1.4 μL of dimethyl maleate, 1.3 μL of a platinum-vinylsiloxane complex (3% platinum, xylene solution), and 0.4 g of hydrosilyl group-containing polysiloxane (HMS-301, manufactured by Gelest, Inc.) were added and mixed.

The resultant liquid resin composition was poured into a mold and cured by heating at 70° C. for 30 minutes, 120° C. for 10 minutes, and 150° C. for 10 minutes to prepare an evaluation molded body of 3 mm in thickness. The various evaluation results are shown in Table 6.

Comparative Example 5

First, 10 g of vinyl group-containing polysiloxane (MQV-7, manufactured by Clariant), 2.9 μL of dimethyl maleate, 2.6 μL of a platinum-vinylsiloxane complex (3% platinum, xylene solution), and 5.6 g of hydrosilyl group-containing polysiloxane (MQH-8, manufactured by Clariant) were added and mixed.

The resultant liquid resin composition was poured into a mold and cured by heating at 70° C. for 30 minutes, 120° C. for 10 minutes, and 150° C. for 10 minutes to prepare an evaluation molded body of 3 mm in thickness. The various evaluation results are shown in Table 6.

Example 21

First, 3 g of octa(vinyldimethylsiloxy)octasilsesquioxane was dissolved in 3 g of toluene, and 0.2 μL of dimethyl maleate, 0.2 μL of a platinum-vinylsiloxane complex (3% platinum, xylene solution), 3.0 g of linear polydimethylsiloxane terminated with a hydrosilyl group (DMS-H03, manufactured by Gelest, Inc.), and 1.8 g of MQ resin terminated with a hydrosilyl group (product name MQH-8, manufactured by Clariant) were added to the resultant solution and dissolved therein. The resultant solution was heated at 60° C. for 2 hours and then cooled to room temperature. Then, 0.2 μL of dimethyl maleate was added to the reaction solution.

The resultant liquid resin composition prepared by distilling off toluene from the reaction solution was poured into a mold and cured by heating at 70° C. for 30 minutes, 120° C. for 20 minutes, 150° C. for 20 minutes, and 180° C. for 20 minutes to prepare an evaluation molded body of 3 mm in thickness. The various evaluation results are shown in Table 6.

TABLE 6

|  |  | Example 18 | Example 19 | Example 20 | Comparative Example 4 | Comparative Example 5 | Example 21 |
|---|---|---|---|---|---|---|---|
| Gel fraction | % | 99 | 100 | 99 | 86 | 93 | 92 |
| Light transmittance | % | 91 | 92 | 91 | 92 | 90 | 91 |
| Blue-violet laser resistance | Change in laser transmittance (%) | 0 | 0 | 0 | 8 | 5 | 12 |
|  | Appearance evaluation | ○ | ○ | Δ | X | X | X |

INDUSTRIAL APPLICABILITY

The present invention relates to a polysiloxane composition maintaining high transparency over a wide wavelength region and a wide temperature region and being excellent in heat resistance, low-dielectric characteristics, workability, and the like, a molded body obtained from the composition, and an optodevice member.

The invention claimed is:

1. A method for molding a polysiloxane composition, wherein the method comprises:
   dissolving components (A) to (C) in a solvent, wherein
   the component (A) is a polysiloxane, which is composed of a polysiloxane compound having a polyhedral skeleton having 6 to 24 Si atoms in its molecule and which has at least one alkenyl group bonded directly or indirectly to a Si atom constitution the polyhedral skeleton,
   the component (B) is a polysiloxane having a hydrosilyl group, and
   the component (C) is a hydrosilylation catalyst;
   reacting a part of alkenyl groups of the component (A) and a part of hydrosilyl groups of the component (B);
   distilling off the solvent to form a liquid resin composition; and then
   curing the polysiloxane composition.

2. A molded body obtained by the method for molding the polysiloxane composition according to claim 1.

3. The method according to claim 1, wherein a component (D), which is a curing retarder, is dissolved in the solvent together with the components (A) to (C).

4. The method according to claim 1, wherein the component (A), the Si atom constituting the polyhedral skeleton is bonded to the alkenyl group through a siloxane bond.

5. The method according to claim 1, wherein the alkenyl group in the component (A) is a vinyl group.

6. The method according to claim 1, wherein the component (B) is a polysiloxane having a linear structure.

7. The method according to claim 1, wherein the component (B) has a hydrosilyl group at a terminus of its molecule.

8. The method according to claim 1, wherein the degree of polymerization of the component (B) is 2 to 300.

9. The method according to claim 1, wherein the component (B) is a cyclic siloxane compound having a hydrosilyl group.

10. The method according to claim 1, wherein the polysiloxane as the component (B) has at least two hydrosilyl groups.

11. The method according to claim 1, wherein the component (B) is a reaction product obtained by hydrosilylation reaction between a hydrosilyl group-containing polysiloxane and an alkenyl group-containing organic compound, the reaction product having at least two hydrosilyl groups in its molecule.

12. The method according to claim 3, wherein the component (D) is a propargyl alcohol and/or a maleate.

13. The method according to claim 1, wherein the liquid resin composition comprises as a component (E) an adhesion-imparting agent.

14. The method according to claim 13, wherein the component (E) is a silane coupling agent.

15. The method according to claim 14, wherein the component (E) is a silane coupling agent having at least one functional group selected from an epoxy group, a methacryl group, an acryl group, an isocyanate group, an isocyanurate group, a vinyl group, and a carbamate group, and a hydrolyzable silicate group in its molecule.

16. The method according to claim 13, wherein the component (E) is an epoxy group-containing compound.

17. The method according to claim 16, wherein the component (E) is a polysiloxane having an epoxy group in its molecule and a polyhedral skeleton.

18. The method according to claim 9, wherein the liquid resin composition comprises as a component (F) a cyclic siloxane compound having an alkenyl group.

19. The molded body according to claim 2, wherein the molded body has a light transmittance of 80% or more at a wavelength of 400 nm with a thickness of 3 mm, and a change in the light transmittance at a wavelength of 400 nm after each of a test at 200±5° C. (24 hours in air) and a test using a metaling weather meter (a black panel temperature 120±5° C., an irradiance 0.53±0.05 kW/m$^2$, an integrated amount of irradiated light 50 MJ/m$^2$) being 5% or less of that before each test.

20. An optodevice member using a laser in a wavelength region of 350 to 450 nm as a light source, the member comprising the molded body according to claim 2 as a main component which exhibits a gel fraction of 95% or more after immersion in toluene for 72 hours at room temperature.

* * * * *

UNITED STATES PATENT AND TRADEMARK OFFICE
CERTIFICATE OF CORRECTION

PATENT NO. : 8,299,198 B2
APPLICATION NO. : 12/305544
DATED : October 30, 2012
INVENTOR(S) : Takao Manabe et al.

Page 1 of 1

It is certified that error appears in the above-identified patent and that said Letters Patent is hereby corrected as shown below:

In Claim 1, lines 7-8;
Change

"to a Si atom constitution"

To be

--to a Si atom constituting--

In Claim 4, lines 1-2;
Change

", wherein the component (A)"

To be

--, wherein in the component (A)--

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,299,198 B2
APPLICATION NO. : 12/305544
DATED : October 30, 2012
INVENTOR(S) : Takao Manabe et al.

It is certified that error appears in the above-identified patent and that said Letters Patent is hereby corrected as shown below:

Column 27, lines 29-30 (Claim 1, lines 7-8)
Change

"to a Si atom constitution"

To be

--to a Si atom constituting--

Column 27, lines 44-45 (Claim 4, lines 1-2)
Change

", wherein the component (A)"

To be

--, wherein in the component (A)--

This certificate supersedes the Certificate of Correction issued March 19, 2013.

Signed and Sealed this
Ninth Day of April, 2013

Teresa Stanek Rea
*Acting Director of the United States Patent and Trademark Office*